(12) United States Patent
Suba et al.

(10) Patent No.: US 7,568,189 B2
(45) Date of Patent: Jul. 28, 2009

(54) CODE TRANSLATION AND PIPELINE OPTIMIZATION

(75) Inventors: Victor Suba, Foster City, CA (US); Stewart Saragaison, Foster City, CA (US); Brian Watson, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 11/740,636

(22) Filed: Apr. 26, 2007

(65) Prior Publication Data

US 2007/0261038 A1    Nov. 8, 2007

Related U.S. Application Data

(60) Provisional application No. 60/797,761, filed on May 3, 2006, provisional application No. 60/797,435, filed on May 3, 2006, provisional application No. 60/797,762, filed on May 3, 2006, provisional application No. 60/746,267, filed on May 3, 2006, provisional application No. 60/746,268, filed on May 3, 2006, provisional application No. 60/746,273, filed on May 3, 2006.

(51) Int. Cl.
*G06F 9/45* (2006.01)
(52) U.S. Cl. ...................................... 717/145
(58) Field of Classification Search ......... 717/134–139, 717/141, 148, 151, 154, 158, 162; 712/4, 712/244; 711/209, 143–145; 345/557
See application file for complete search history.

(56) References Cited

U.S. PATENT DOCUMENTS 5,088,033 A    2/1992    Binkley et al.

(Continued)

FOREIGN PATENT DOCUMENTS

WO    WO 2007/131089 A2    11/2007

(Continued)

OTHER PUBLICATIONS

International Search Report mailed on Mar. 5, 2008, for PCT Application No. PCt/US07/68153 filed on May 3, 2007, 1 page.

(Continued)

*Primary Examiner*—Tuan Anh Vu
(74) *Attorney, Agent, or Firm*—Townsend and Townsend and Crew LLP

(57) ABSTRACT

An emulator uses code translation and recompilation to execute target computer system applications on a host computer system. Target application code is partitioned into target application code blocks, and related target application code blocks are combined into block groups and translated. Translated application code block groups are sized to comply with restrictions on branch instruction size. Upon selecting an application code block group for execution, a cache tag is used to determine if a corresponding translated code block group is available and valid. If not, the block group is translated and executed. Sequentially executed translated code blocks are located in adjacent portions of memory to improve performance when switching between translated code blocks. The emulator may use a link register of the host computer system to prefetch instructions and data from translated code blocks. The emulator also takes into account structural hazards in translating instructions.

20 Claims, 10 Drawing Sheets

U.S. PATENT DOCUMENTS

| | | | |
|---|---|---|---|
| 5,768,593 A * | 6/1998 | Walters et al. | 717/141 |
| 5,784,595 A | 7/1998 | Devins et al. | |
| 6,205,414 B1 | 3/2001 | Forsman et al. | |
| 6,223,339 B1 * | 4/2001 | Shah et al. | 717/158 |
| 6,397,242 B1 * | 5/2002 | Devine et al. | 718/1 |
| 6,463,582 B1 * | 10/2002 | Lethin et al. | 717/158 |
| 6,502,237 B1 * | 12/2002 | Yates et al. | 717/136 |
| 6,631,514 B1 * | 10/2003 | Le | 717/137 |
| 6,675,289 B1 | 1/2004 | Eslick et al. | |
| 6,763,328 B1 | 7/2004 | Egolf et al. | |
| 6,820,255 B2 * | 11/2004 | Babaian et al. | 717/151 |
| 6,947,052 B2 * | 9/2005 | Jeremiassen | 345/557 |
| 2002/0072893 A1 | 6/2002 | Wilson | |
| 2003/0101439 A1 * | 5/2003 | Desoli et al. | 717/148 |
| 2004/0221273 A1 * | 11/2004 | Sandham et al. | 717/134 |
| 2004/0221278 A1 * | 11/2004 | Dankel et al. | 717/139 |
| 2005/0015758 A1 * | 1/2005 | North | 717/138 |
| 2007/0180438 A1 | 8/2007 | Suba et al. | |
| 2007/0260446 A1 | 11/2007 | Suba et al. | |

FOREIGN PATENT DOCUMENTS

| | | |
|---|---|---|
| WO | WO 2007/131116 A2 | 11/2007 |
| WO | WO 2007/131116 A3 | 11/2007 |

OTHER PUBLICATIONS

International Search Report mailed on Jun. 12, 2008, for PCT Application No. PCT/US/07/68110 filed on May 3, 2007, 2 pages.

* cited by examiner

US 7,568,189 B2

CODE TRANSLATION AND PIPELINE OPTIMIZATION

CROSS-REFERENCE TO RELATED APPLICATIONS

This application claims priority to U.S. Provisional Patent Application No. 60/797,761, filed May 3, 2006, entitled "Code Translation and Pipeline Optimization," which is related to U.S. Provisional Patent Application No. 60/763,568, filed Jan. 30, 2006, entitled "Branch Prediction Thread Management," U.S. Provisional Patent Application No. 60/797,435, filed May 3, 2006, entitled "DMA and Graphics Interface Emulation," now corresponding to U.S. patent application Ser. No. 11/740,652; U.S. Provisional Patent Application No. 60/797,762, filed May 3, 2006, entitled "Stall Prediction Thread Management," now corresponding to U.S. patent application Ser No. 11/700,448; U.S. Provisional Patent Application No. 60/746,267, filed May 3, 2006, entitled "Translation Block Invalidation Prehints in Emulation of a Target System on a Host System;" and U.S. Provisional Application No. 60/746,268, filed May 3, 2006, entitled "Register Mapping in Emulation of a Target System on a Host System;" U.S. Provisional Patent Application No. 60/746,273, filed May 3, 2006, entitled "Method and Apparatus for Resolving Clock Management Issue in Emulation Involving Both Interpreted and Translated Code, " all of which are hereby incorporated herein by reference for all purposes.

BACKGROUND OF THE INVENTION

The invention is related to emulation software for executing applications on a computer or information processing device other than the one for which the applications were originally written. Applications are typically developed to be executed by computer systems of a particular type or that meet certain specifications. Developers specify the functions of an application as source code expressed in one or more programming languages. Source code is typically designed to be easily written and understood by human developers. Development applications, such as compilers, assemblers, linkers, and interpreters, convert an application expressed as source code into binary code or object code modules, which are in a format capable of being executed by the intended computer system. The binary code or object code format typically is adapted to the architecture of the intended computer system, including the number and type of microprocessors; the arrangement of memory and storage; and the audio, video, networking, and other input and output subsystems. The computer system originally intended to execute an application is referred to as a target computer system.

Often, it is desirable to be able to execute applications on different types of computer systems other than the one for which the applications were originally written. For example, users with a new computer system, such as a video game console, may still wish to use applications previously purchased for other types of computer systems, such as older video game consoles. A computer system that is of a different type than the target computer system originally intended for an application is referred to as a host computer system.

One solution for executing applications on host computer systems, i.e. types of computer systems other than the one for which the applications were originally written, is to modify the application. Application source code can be modified, or ported, to a different type of computer system. However, this is difficult, time-consuming, and expensive if there are substantial differences between the target computer system and the host computer system.

Emulation is another solution for executing applications on host computer systems. Emulation software and/or hardware enables the host computer system to mimic the functionality of the target computer system. A host computer system using the appropriate emulation will ideally respond to an application's binary code in the same or similar way as the target computer system.

One of the simplest types of emulation is a software interpreter that sequentially analyzes each instruction in an application's binary code modules, creates one or more equivalent instructions for the host computer system, and then executes the equivalent instructions. The emulator also typically includes data structures adapted to represent the state of the emulated target computer system. The emulator also may include software virtual machine functions or modules adapted to mimic the hardware functions of the emulated target computer system and to interface hardware resources of the host computer system with the application.

Because of the overhead associated with constantly analyzing and converting application instructions into equivalent host computer system instructions, software interpreters often require orders of magnitude more processing performance on a host computer system to execute an application at the same speed as the target computer system. Thus, for applications requiring real-time emulation, software interpreters are often too slow to be used when the host computer system is not substantially faster than the target computer system.

A more complicated type of emulation employs binary translation to convert large portions of an application's binary code modules into corresponding portions of host computer system instructions prior to execution. Binary translation can be performed statically, i.e. prior to the execution of the application by the host computer system, or dynamically, i.e. during the execution of other portions of the application by the host computer system. Translated portions, or blocks, of the application can be cached, thereby amortizing the performance penalty associated with emulation for frequently executed portions of the application, such as loops, functions, and subroutines. Translated blocks of the application can also be optimized for execution by host computer system, taking advantage of application information known in advance or determined while running portions of the application.

It thus is desirable for emulators to provide improved performance when executing applications on a host computer system. It is further desirable for emulators to optimize translated code to take advantage of unique hardware features of the host computer system.

BRIEF SUMMARY OF THE INVENTION

Embodiments in accordance with the present invention include an emulator using code translation and recompilation to execute target computer system applications on a host computer system. In one embodiment, application code is partitioned into application code blocks of related instructions. Function calls and returns, jump table calls, and conditional branches can delineate boundaries between application code blocks. In an embodiment, application code block groups are sized to comply with branch instruction restrictions. When an application code block group is selected for execution, a cache tag of the application code block group is used to determine if a corresponding translated code block group is available and valid. If not, the application code block is translated into a corresponding translated code block and executed.

In one embodiment, sequentially executed translated code blocks are located in adjacent portions of memory to improve performance when switching between translated code blocks. In a further embodiment, when a function call from a first translated code block will return to a second translated code block, the emulator uses a link register of the host computer system to prefetch instructions and data from the second translated code block. In still a further embodiment, the emulator verifies the function return address with a return address stored by the target virtual machine in case a function modifies its return address.

In an embodiment, when translating application code blocks, the emulator takes into account structural hazards such as updates to status flag and other registers lagging behind their respective instructions. Code analysis is used to identify instructions susceptible to structural hazards due to dependence on a value set by a preceding instruction. The emulator then identifies the preceding instruction creating the value in question, and adds instructions preserving or recreating this value until accessed. The added instructions may modify a status flag value of the host computer system to match the behavior of the status flag register of the target computer system.

A further understanding of the nature and the advantages of the inventions disclosed herein may be realized by reference of the remaining portions of the specification and the attached drawings.

BRIEF DESCRIPTION OF THE DRAWINGS

The invention will be described with reference to the drawings, in which.

DETAILED DESCRIPTION OF THE INVENTION

Figure 1:
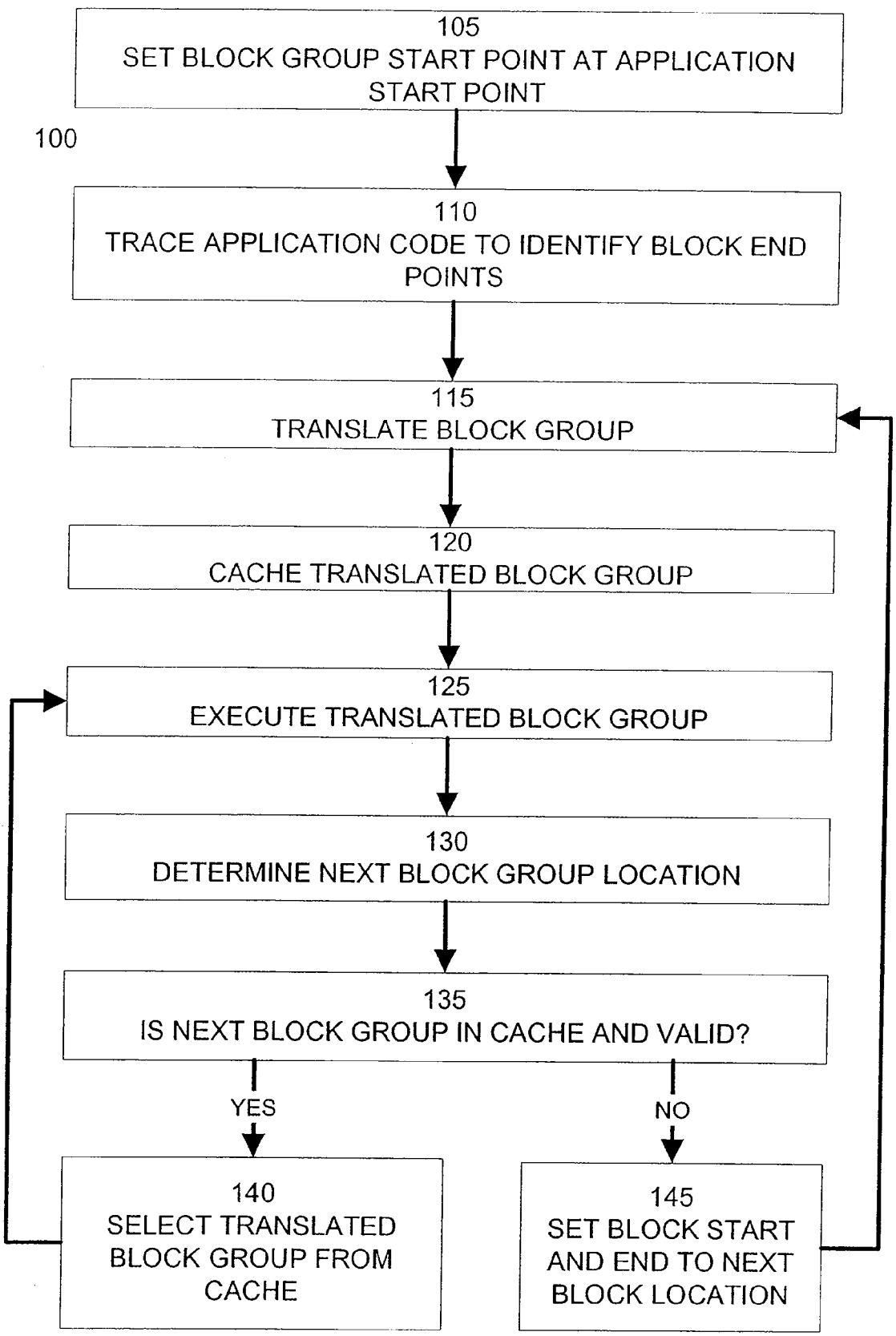
FIG. 1 illustrates a method of translating and executing application code in an emulator according to an embodiment of the invention.

FIG. 1 illustrates a method 100 of translating and executing application code in an emulator in accordance with one embodiment of the present invention. In this embodiment, the emulator partitions the application code into blocks of related instructions. Groups of related blocks, such as blocks from the same function, are chained together to form block groups. Each block group is translated or recompiled to a format capable of execution by the host computer system. Method 100 begins at step 105, which sets the start of a block of application code to be translated to the beginning of the application code or any other application entry point, such as the beginning of a function.

Step 110 traces forward through the application code from the block start point to identify one or more block end points. In an embodiment, block end points are indicated by application code instructions that changes the control flow of the application, such as a branch instruction, a function call, a function return, or a jump table call.

Step 115 translates the set of application code instructions defined from the block start point to the block end points into a format capable of being executed by the host computer system. Embodiments of step 115 can use any code translation or recompilation technique known in the art to accomplish this task.

Step 120 caches the translated code block groups. In an embodiment, the blocks of a block group are chained or linked together according to the control flow of the application. In an embodiment, step 120 computes a cache tag for each translated code block or alternatively, a single cache tag for an entire block group of translated code blocks. The cache tag is used to determine whether the cached translated code block is still a valid translation.

In an embodiment, the cache tag of a translated code block or block group is a checksum based upon its corresponding untranslated application code blocks. In another embodiment, the cache tag is or is derived from an effective memory address of corresponding untranslated application code blocks. As discussed in detail below, these types of cache tags can be used to match application code blocks with corresponding cached translated code blocks, regardless of the memory location of the application code block. In still another embodiment, the cache tag is, or is derived from, the memory address of the corresponding untranslated application code blocks.

Step 125 executes the translated code block group. Embodiments of the emulator execute translated code blocks on the same processor or on a different processor or processor core element that executes method 100. As discussed above, multiple blocks of a block group may be chained or linked together according to the control flow of the application. In one embodiment, the end of a translated code block includes a conditional or unconditional branch instruction used to select the next translated block in the block group to be executed. During step 125, the host system follows these instructions to execute the translated code blocks of a block group in the sequence specified by the control flow of the application. In a further embodiment, the end of a translated block can include an instruction calling the emulator or code translation application at the end of the block group, allowing the host system to continue executing the steps of method 100.

Step 130 determines the location of the next block group of application code to be executed. In an embodiment, static code analysis techniques can be used to identify the next block of application code to be executed in advance of runtime. In another embodiment, if the next block of application code to be executed cannot be determined statically, dynamic code analysis techniques are used to monitor the execution of a translated code block group to determine the next block group of application code at runtime. In further embodiments, step 130 makes this determination when the execution of the current translated code block is complete.

In an embodiment, step 130 determines the block start location of the next block group of application code from static or dynamic code analysis of the most recently executed translated code block. Step 130 then traces forward through the application code to identify one or more ends of code blocks in the block group, similar to step 110.

Step 135 determines whether the next block group has already been translated and stored in the translated code block cache. In an embodiment, step 135 determines a cache tag value, such as a checksum, effective memory address, or actual memory address, of the next application code block group. Step 135 then compares this cache tag value with the cache tag previously stored in associated with translated code blocks in the translated code block cache. If the two cache tag values match, then the cached translated code block group is a valid representation of the application code block. Step 140 then selects the translated code block group from the translated code block cache. Method 100 then proceeds to step 125 to execute the selected translated code block group.

Conversely, if step 135 determines that the translated code block cache does not have a valid representation (or any representation at all) of the next block group of application code, step 145 sets the block start and end points to the boundaries of the next block group of application code. Method 100 then proceeds to step 115 to translate the next block of application code into a corresponding translated code block and cache and execute the newly translated code block. Steps 115 through 145 may be similarly repeated for each block of application code as the emulator processes and executes the application.

As discussed above, an embodiment of the emulator caches translated code blocks. Before executing a cached code block, a cache tag value of the virtual machine memory storing application code is compared with the cache tag of the corresponding cached translated code block. This ensures that the cached translated code block is a valid representation of the application code at the time of execution.

However, some applications employ relocatable code, which can be positioned at different places in memory. If the cache tag for evaluating the validity of a cached translated code block group is derived from a fixed memory address or a checksum of a fixed range of memory, the cache tag value for the code block group will change each time the relocatable code is moved to a different part of memory, even if the relocatable code itself doesn't change. Thus, even though the translated code block cache may already include a translated version of the relocatable code, a cache miss will occur and the emulator will retranslate the same application code each time it is moved to a new location. As a result, the emulator performance degrades substantially.

To overcome this problem in accordance with one embodiment, cache tag values are determined for code block groups based on application code block group boundaries, rather than fixed ranges of memory addresses. In one implementation of this embodiment, when a block group of application code is selected for execution and identified, a checksum of this application code block group is created. This checksum is compared with the checksums previously stored in association with the translated code block cache. If the application code block group checksum matches a checksum associated with a cached translated code block, this translated code block is executed.

In another implementation of this embodiment, the cache tag is based on an effective or source memory address of the application code block group. For example, an application might copy a block group of relocatable code from a fixed location in main memory into different locations in a scratchpad or execution memory. In this example, the effective address of the block group is the memory address in main memory, which does not change. By using this memory address to create the cache tag, the translated code block cache is effective with relocatable code.

Figure 2:
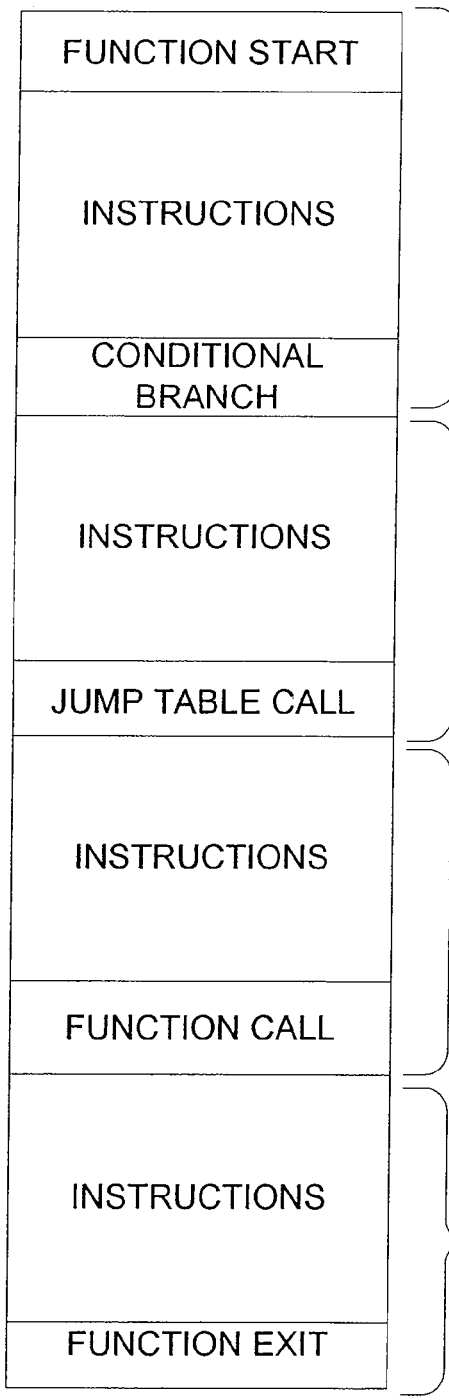
FIG. 2 illustrates an example partitioning of application code into translated code blocks according to an embodiment of the invention.
Figure 2:
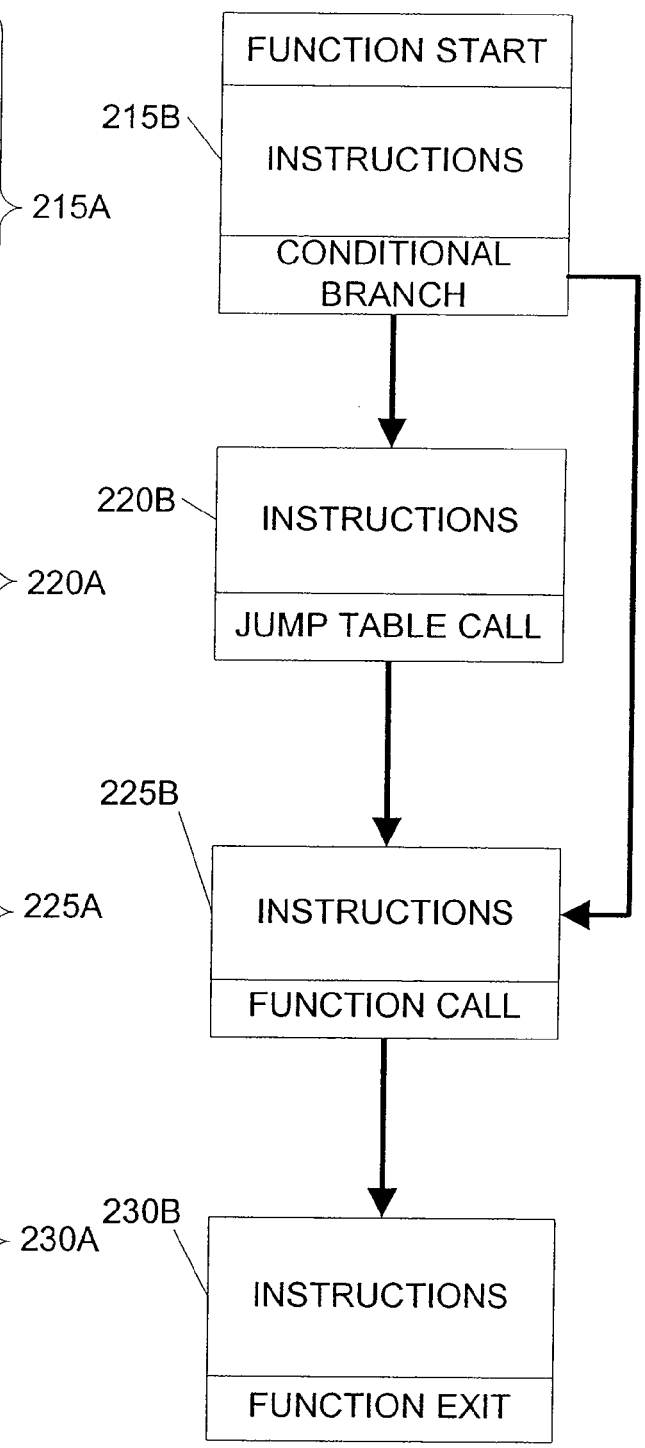

FIG. 2 illustrates an example partitioning 200 of application code into translated code blocks according to an embodiment of the invention. In this example, the original application code 205 is partitioned into code blocks along boundaries defined by control flow instructions, such as conditional branch instructions, jump tables, function calls, and function returns. Related application code blocks are then chained together to form a block group.

For example, application code 205 represents function code of an application. Block group 210 comprises code block 215B, corresponding with portion 215A of the application code; code block 220B, corresponding with portion 220A of the application code; code block 225B, corresponding with portion 225A of the application code; and code block 230B, corresponding with portion 230A of the application code.

The code blocks of block group 210 are chained together according to the control flow of the application code 205. For example, the conditional branch at the end of block 215B can direct the host computer system to execute either code block 220B or 225B.

The application code blocks are translated from a target computer system format into a set of corresponding translated code blocks capable of being executed by the host computer system. Some types of host computer systems have restrictions on the distance in address space between a conditional branch or other control flow instruction and the branch destination or destination address. Complying with the restrictions can be made more difficult because translated code blocks are often larger than their corresponding portions of target computer system code. Thus, the translated code block groups should be sized so that the host computer system restrictions are not violated.

Figure 3:
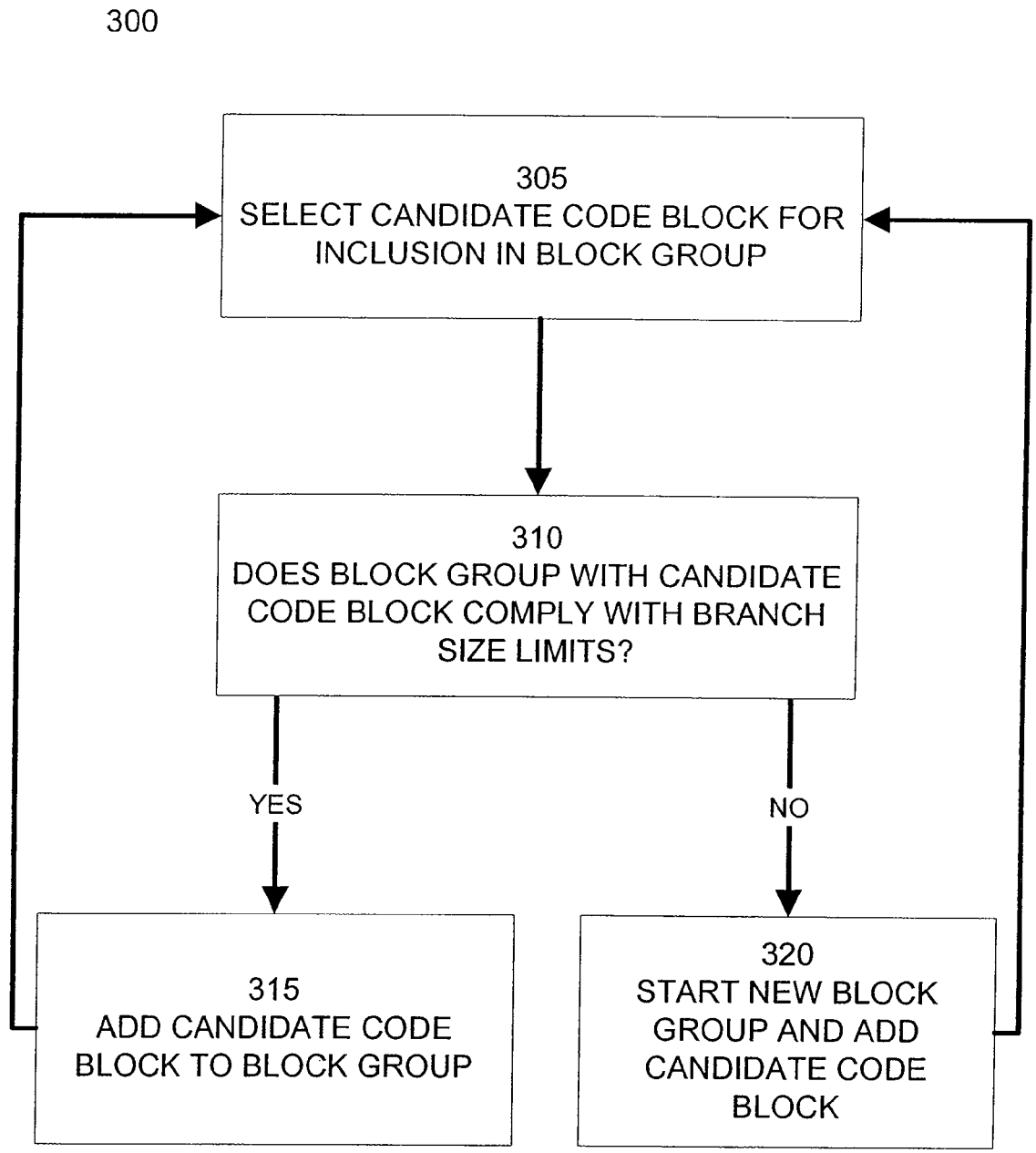
FIG. 3 illustrates a method of sizing translated code blocks according to an embodiment of the invention.

FIG. 3 illustrates a method 300 of sizing translated code blocks in accordance with one embodiment. Step 305 selects a candidate translated code block group for potential inclusion in a block group and specifies a possible location in the translated code block group for the candidate translated code block. Step 310 evaluates the translated block group including the selected candidate translated code block to determine if all of the branch instructions comply with branch size restrictions of the host computer system.

In an embodiment, step 310 compares the size of the translated block group including the candidate code block to a maximum size limit. In another embodiment, step 310 uses static or dynamic code analysis to determine the potential destination addresses for each branch or control flow instruction. These destination addresses are then individually compared with their respective instructions to determine if the maximum size limit is violated.

If the translated code block group with the candidate code block does not comply with the branch size restrictions of the host computer system, step 320 starts a new translated code block group and adds the candidate code block to this new block group. Method 300 then proceeds back to step 305 to select another candidate code block for inclusion in the new translated code block group.

Conversely, if the translated code block group with the candidate code block does comply with the branch size restrictions of the host computer system, step 315 adds the candidate code block to translated code block group. Method 300 then proceeds back to step 305 to select another candidate code block for possible inclusion in the translated code block group.

In further embodiments, the translated code blocks of the translated code block group may be rearranged to comply with the branch size restrictions of the host computer system. In still another embodiment, multiple branch instructions can be chained together to allow for larger distances between source and destination addresses.

Figure 4A:
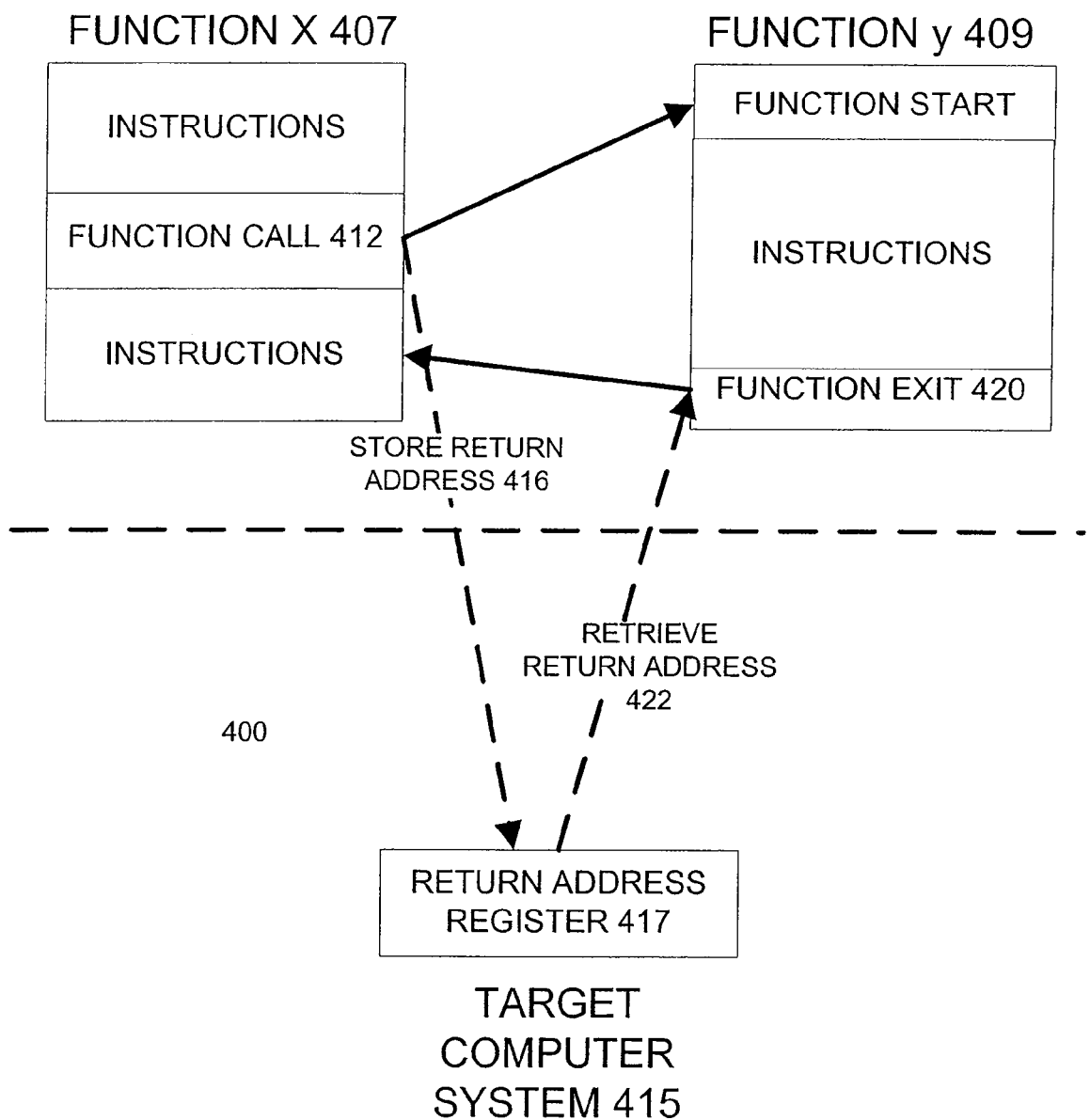
FIGS. 4A-4B illustrate an example method of mapping function calls from application code to an optimal format for the host computer system according to an embodiment of the invention.
Figure 4B:
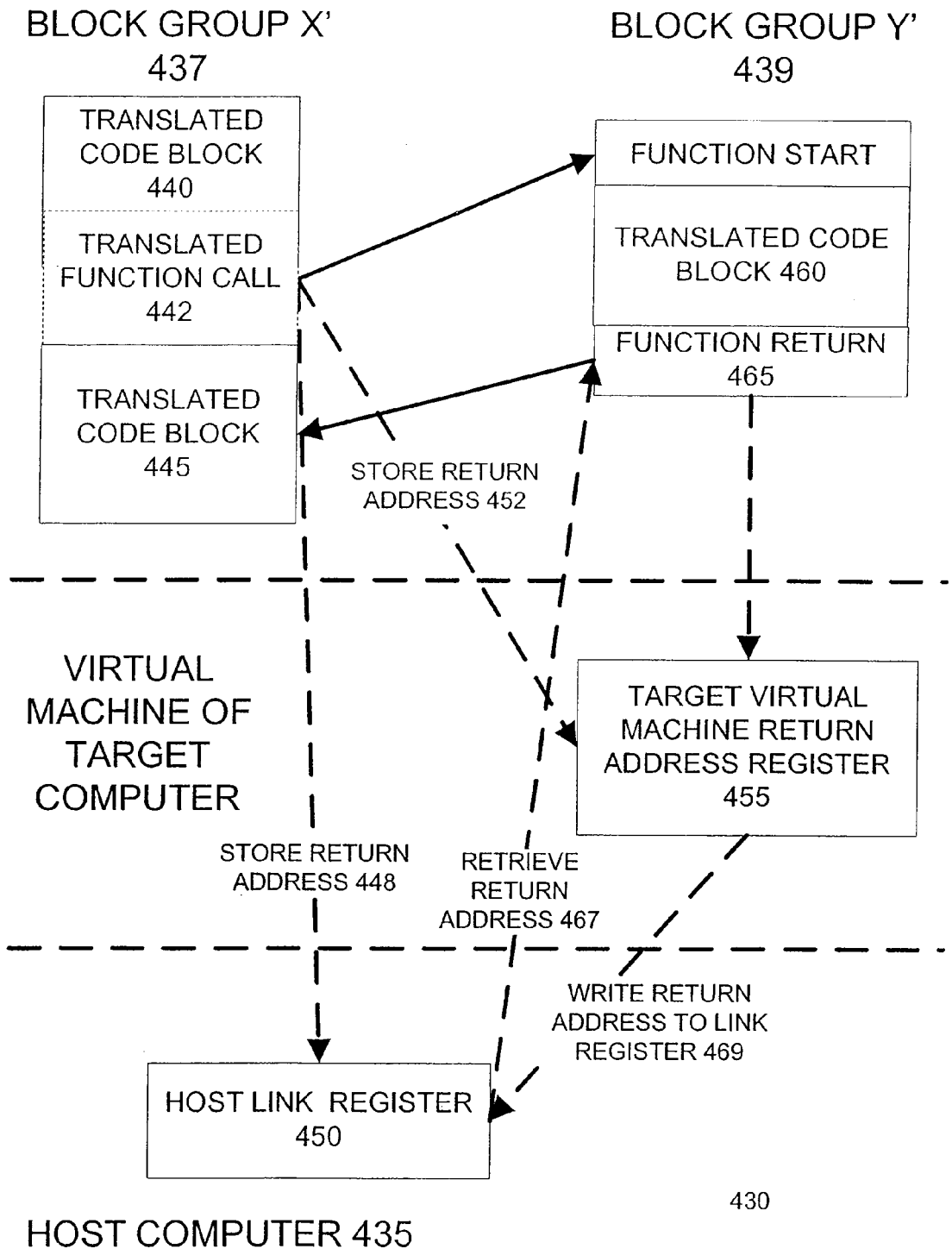

In an embodiment, the emulator attempts to store translated code blocks corresponding to adjacent application code blocks in adjacent portions of memory. Preserving adjacency between translated code blocks in block groups can improve branching performance for some types of host computer systems. FIGS. 4A and 4B illustrate an example application of this embodiment of the invention.

FIG. 4A illustrates a function call and return mechanism 400 in an application for example target computer system. In this example 400, the target application 405 includes code for an example function X 407 and an example function Y 409. In this example 400, function X 407 includes a function call instruction 412, which directs the target computer system 415 to execute function Y 409.

In response to function call instruction 412, the target computer system 415 stores the return address 416 for the function call in return address register 417. The return address is typically the address of the instruction immediately following the function call instruction 412. However, some types of target computer systems and function call instructions set the return address to the location of a different instruction. In some types of target computer systems, the return address is stored in a stack or other memory instead of a register 417. In still further types of target computer systems, the previous value of the return address register 417 is stored in a stack or other memory to allow for multiple levels of function calls and function recursion.

After storing the appropriate return address 416, the target computer system 415 begins to execute function Y 409. When this is complete, a function return instruction 420 directs the target computer system 415 to resume execution of function X 407 beginning with the instruction at the previously stored return address. In response to the function return instruction 420, the target computer system 415 retrieves 422 the previously stored return address from the return address register 417. Using this return address, the target computer system 415 resumes execution 424 of function X 407 at the appropriate location.

FIG. 4B illustrates a corresponding function call and return mechanism 430 for a translated application executed by a host computer system according to an embodiment of the invention. In this example 430, a host computer system 435 executes a translated target computer system application 432 corresponding with application 405 discussed above. Translated application 432 includes translated block group X' 437 and translated block group Y', which correspond with functions X 407 and Y 409 of the target computer system application, respectively.

Translated block group X' 437 includes a translated code blocks 440 and 445. In an embodiment, the target application code is partitioned into code blocks by control flow functions, such as the translated function call instruction 442, which corresponds with untranslated function call instruction 412. Moreover, as translated code blocks 440 and 445 correspond with adjacent portions of the untranslated application, an embodiment of the emulator attempts to store translated code blocks 440 and 445 in adjacent portions of memory to facilitate the transfer of execution between translated application code blocks.

In this embodiment, translated code block 440 ends with one or more translated function call instructions 442 that direct the host computer system to execute block group Y' 439, which corresponds with the function Y 409 of the original untranslated application.

In response to the translated function call instruction 442, the host computer system 435 stores 448 the function return address in the host link register 450. The host link register 450 is a specialized register of the host computer 435 adapted to store function return addresses. Often, the host computer system 435 is adapted to prefetch one or more instructions beginning at the function return address stored in a link register. This reduces or eliminates pipeline stalls upon returning from a function.

In an embodiment, the host computer system 435 stores 448 the address of the first instruction following the translated function call instruction 442 in the host link register 450. When translated code blocks 440 and 445 are arranged in adjacent portions of host computer system memory, this return address corresponds with the first instruction of translated code block 445. When translated code blocks 440 and 445 cannot be stored in adjacent portions of host computer system memory, an additional instruction must be added to translated code block 440 following the translated function call to jump to translated code block 445.

In addition to storing the return address in the host link register 450, the host computer system 435 also stores 452 a target memory space return address value in a target virtual machine return address register 455. The target memory space return address value stored in the target virtual machine return address register 455 corresponds with the return address value that would have been stored by the target computer system 415 in its return address register 417 in response to the function call instruction 412. The target virtual machine return address register 455 is a portion of the emulator virtual machine mimicking the state and functions of return address register 417 of the target computer system 415. The target virtual machine return address register 455 can be mapped directly to a register of the host computer system 435 or assigned to a location in the host computer system 435 memory. Additional virtual machine software code can be associated with the target virtual machine return address register 455 to mimic the state and functions of the return address register 417 of the target computer system 415.

After storing the return address for the translated application code block in the host link register 450 and the corresponding target memory space return address in target virtual machine return address register 455, the host computer system 435 begins to execute translated block group Y' 439, corresponding to the function Y 409 in the target application. The host computer system 435 executes the one or more translated code blocks 460 of block group Y' 439 to perform the same or equivalent operations as function Y 409. At the end of translated block group Y' 439, one or more translated function return instructions 465 directs the host computer system 435 to resume execution of translated block group X' 437.

Some target computer applications may overwrite the return address stored in the return address register 417 with a different address. This may be done so that a function returns to a different location in an application than it was initially called from. To account for this behavior, an embodiment of the emulator directs the host computer system 435 to retrieve 467 the target memory space return address previously stored in the target virtual machine return address register 455 in response to the translated function return instruction 465. In this embodiment, the retrieved target memory space return address is converted to a corresponding memory address in the host computer system.

The host computer system 435 then writes 469 the converted return address to the host link register 450. As discussed above, the host computer system 435 prefetches instructions and data starting at the address stored in the link register to avoid a pipeline stall when branching between translated code blocks. In this example, these prefetched instructions and data are part of translated code block 445. If the converted return address is the same as the return address previously stored in the host link register 450 by the translated function call 442, the host computer system 435 ignores the write 469 to the host link register 450 and retains the prefetched instructions and data of translated code block 445. The host computer system 435 can then begin executing the translated code block 445 of translated block group X' 437. Under this condition, the host computer system 435 avoids a pipeline stall and its associated performance penalty when jumping from the execution of translated block group Y' 439 to translated code block 445 of block group X' 437.

Conversely, if the converted return address is different than the return address previously stored in the host link register 450 by the translated function call 442, the host computer system 435 discards the prefetched instructions and data and executes translated code blocks beginning at the return address specified by the target virtual machine return address register 455. This condition may occur if the target computer application overwrites the return address stored in the return address register 417 with a different address. Under this condition, the host computer system 435 will experience a pipeline stall and its associated performance penalty when jumping from the execution of translated block group Y' 439 to translated code block 445 of block group X' 437. However, applications with this behavior are relatively rare compared to the default function call and return mechanism.

Embodiments of the invention can include variations of the above described behavior depending upon the type of target computer system, host computer system, and translated target applications. For example, if the target application never modifies the contents of the target computer system return address register 417 (or if the target computer system prohibits this behavior), then the host computer system may omit writing the contents of the counterpart target virtual machine return address register 455 to the host link register 450 prior to returning from a translated function call. Moreover, if the target application never reads the contents of the target computer system return address register 417, except when returning from a function call, then the target virtual machine return address register 455 can be omitted entirely.

In still further embodiment, the target virtual machine return address register 455 can store the return address expressed in host address space, rather than the target address space. Additional functions associated with the target virtual machine return address register 455 can translate this return address between the host address space and the target address space as needed. This may improve performance of the emulator if the translated target application infrequently accesses the virtual machine return address register 455.

Sometimes, the next translated code block cannot be stored adjacently to the previous translated code block. In these situations, an embodiment of step 410 uses a modified translated instruction to push the correct starting address for the next translated code block into the link register.

Some target computer systems have unique structural characteristics that need to be taken into account for emulation to operate correctly on the host computer system. For example, the value of a target computer system status flag register, which stores status flags such as the sign, zero, overflow, underflow, divide by zero, and carry bits, may lag its corresponding instruction by several processor cycles due to pipelining and other characteristics. In this example, if an add instruction would cause a status flag value to be set, such as the carry bit flag being set to "1", this status flag value would not appear in the status flag register until several processor cycles after the add instruction was executed.

If the lag times for updating status flag register values (or other state information) are different for the source and host computer systems, the emulator must compensate to ensure that the correct status flag register values are synchronized with the appropriate instructions. One approach is to copy the status flag values from the status flag register of the host computer system to a buffer after every translated instruction. The buffer values can then be synchronized with the appropriate translated instructions. However, this approach is very time-consuming and can decrease emulator performance.

However, in some types of host computer systems, the host computer system status flags may behave differently than their counterparts in the target computer system. Some types of host computer systems may incur large performance penalties in accessing its status flags. Moreover, some host computer systems may not even have counterparts to some or all of the status flags of the target computer system.

Figure 5:
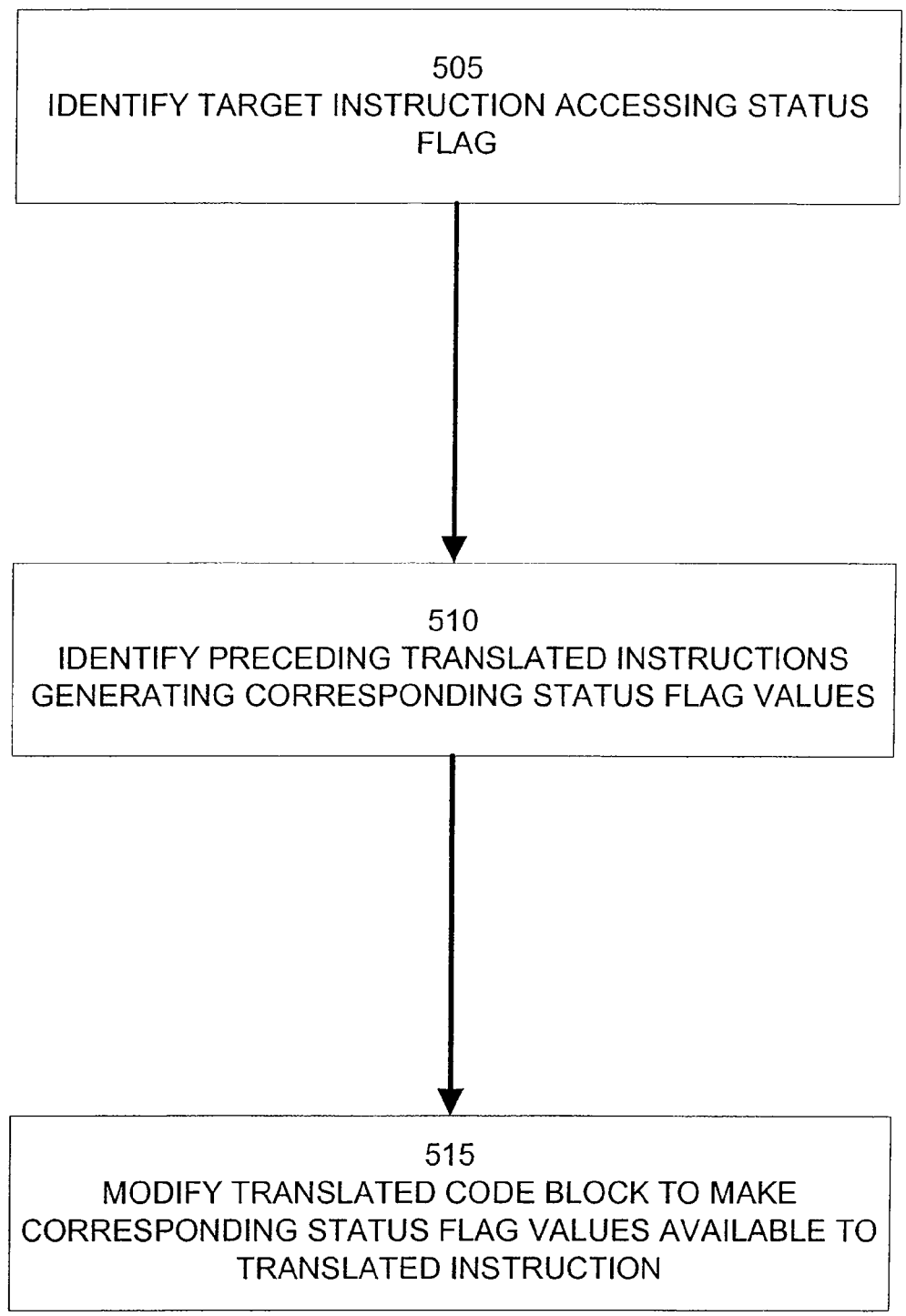
FIG. 5 illustrates a method of compensating for status flag differences according to an embodiment of the invention.

An alternative approach stores status flag values to a register or buffer only when needed. FIG. 5 illustrates a method 500 of compensating for status flag differences according to an embodiment of the invention. Step 505 identifies an application code instruction accessing a status flag register value. The identified instruction can be an instruction that reads a value from the status flag register of the target computer system or an instruction that behaves differently based on a value from the target computer system status flag register, such as some types of conditional branch instruction.

Step 510 traces back in the application code to identify one or more instructions potentially generating the status flag value accessed by the instruction identified in step 505. In an embodiment, step 510 takes into account any lag in the target computer system between the time when an instruction is executed and when the status flag register is updated with the appropriate value. Some status flags are "sticky", in the sense that once they are set, they remain at that value until read or reset by the target computer system. For these types of status flags, step 510 identifies one or more instructions potentially responsible for setting the status flag value.

Step 515 analyzes one or more translated instructions corresponding with the application code instructions identified in steps 505 and 510. If a difference between the source and host computer systems would cause the translated code to operate incorrectly, for example by accessing the wrong value in the status flag register, step 515 modifies the translated code block. In an embodiment, step 515 adds instructions to the translated code block to preserve a status flag value of the host computer system in a register or memory for later use by the translated application code. Additionally, step 515 modifies the translated instruction accessing the status flag value to refer to the stored status flag values, rather than the current values of the status flag register.

In a further embodiment, step 515 adds instructions to the translated code block to correct for differences in setting status flag values. For example, if an instruction executed on the target computer system would set a status flag value, such as a sign bit, but its corresponding translated instruction does not do the same thing in the status flag register of the host computer system, then step 515 can add instructions to compensate for this behavior.

In still a further embodiment, step 515 adds instructions to the translated code block to recreate the status flag values expected by the translated target application. This may be required if the host computer system does not have a status flag corresponding to a status flag of the target computer system. Additionally, this embodiment of step 515 may be used if accessing status flags in the host computer system decreases performance more than simply recreating the status flag value with additional instructions.

Figure 6:
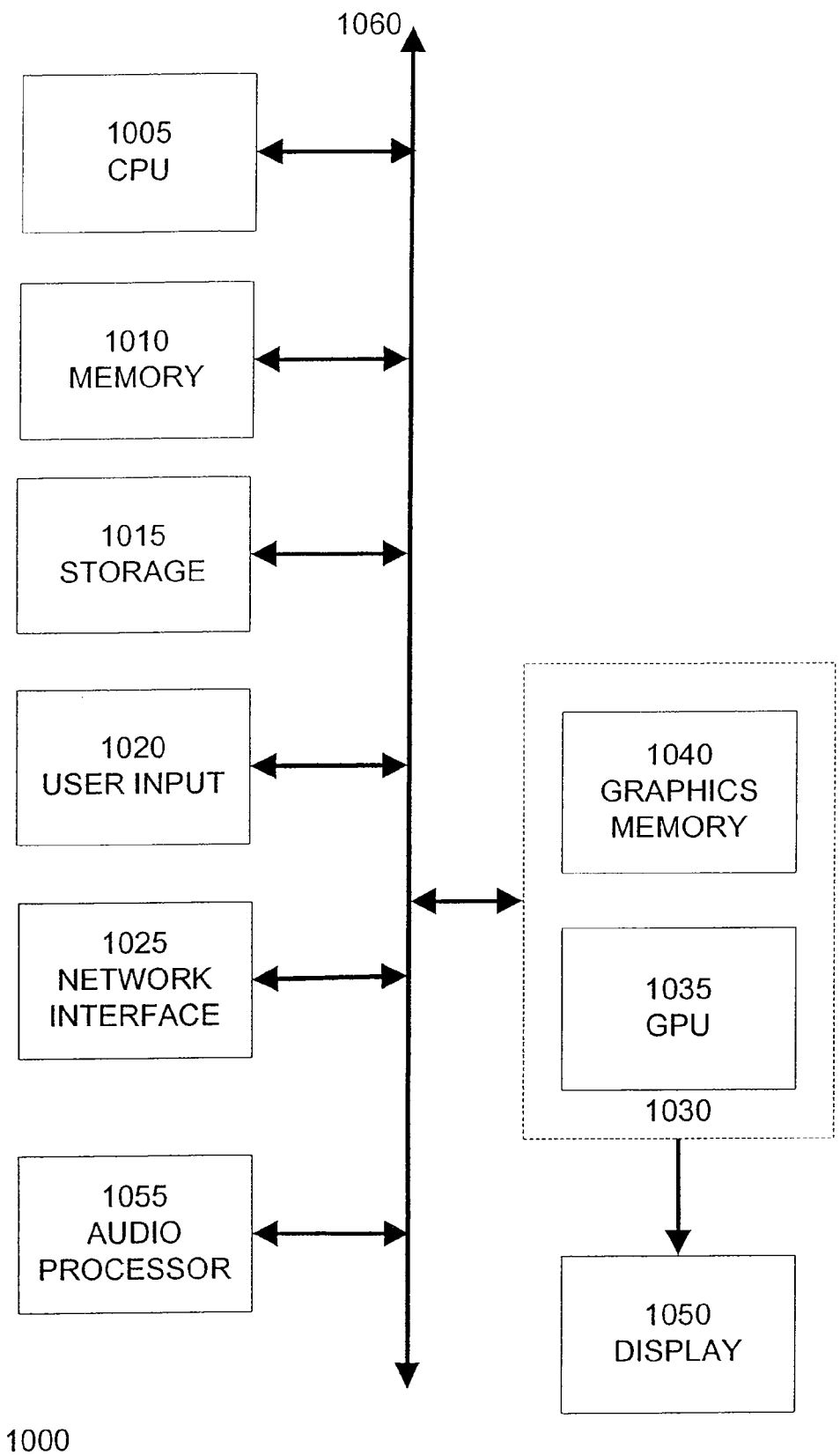
FIG. 6 illustrates an example hardware system suitable for implementing an embodiment of the invention.

FIG. 6 illustrates an example hardware system suitable for implementing an embodiment of the invention. FIG. 6 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Figure 7:
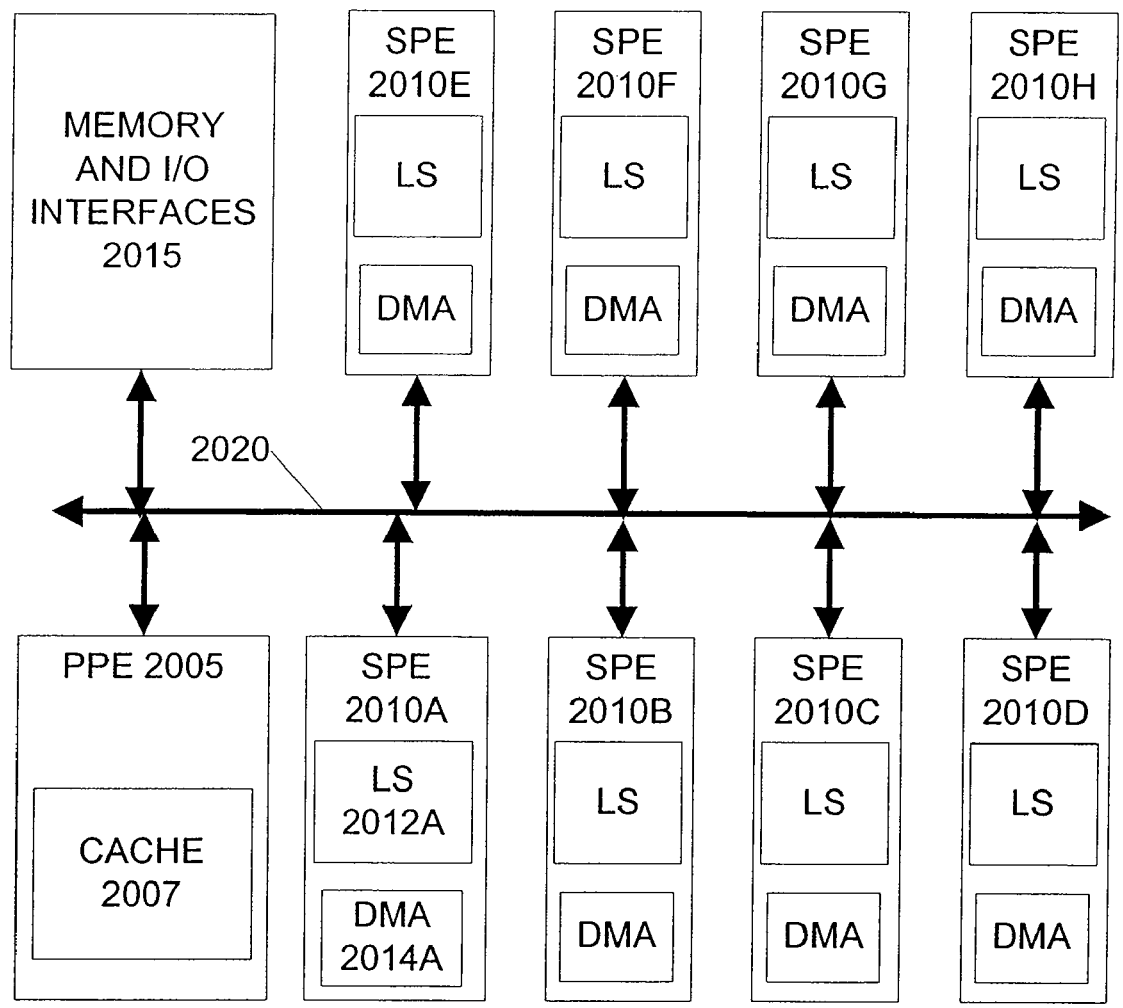
FIG. 7 illustrates an example processor suitable for implementing an embodiment of the invention.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications. FIG. 7 illustrates an example processor 2000 suitable for implementing an embodiment of the invention.

Processor 2000 includes a number of processor elements, each capable of executing independent programs in parallel. Processor 2000 includes PPE processor element 2005. PPE processor element is a general-purpose processor of CISC, RISC, or other type of microprocessor architecture known in the art. In one example, PPE processor element 2005 is a 64-bit, multithreaded RISC architecture microprocessor, such as the PowerPC architecture. PPE processor element 2005 can include a cache memory 2007 partitioned into one, two, or more levels of caches temporarily holding data and instructions to be executed by PPE processor element 2005.

For additional performance, processor 2000 includes a number of SPE processor elements 2010. In this example, processor 2000 includes eight SPE processor elements 2010A-2010H; however, other example processors can include different number of SPE processor elements. SPE processor elements 2010 are adapted for stream processing of data. In stream processing, a program is executed repeatedly on each item in a large set of data. To facilitate stream processing, the SPE processor elements 2010 may include instruction execution units capable of executing SIMD instructions on multiple data operands simultaneously. SPE processor elements 2010 may also include instruction units capable of executing single-instruction, single data (SISD) for more general processing tasks.

Each SPE processor element, such as SPE processor element 2010A, includes local data and instruction storage 2012A. Data and instructions can be transferred to and from the local data and instruction storage 2012A via DMA unit 2014A. The DMA units, such as unit 2014A, are capable of transferring data to and from each of the SPE processor elements 2010 without processor supervision, enabling the SPE processor elements 2010 to process data continuously without stalling.

Data and instructions are input and output by the processor 2000 via memory and I/O interfaces 2015. Data and instructions can be communicated between the memory and I/O interfaces 2015, the PPE processor element 2005, and SPE processor elements 2010 via processor bus 2020.

Figure 8:
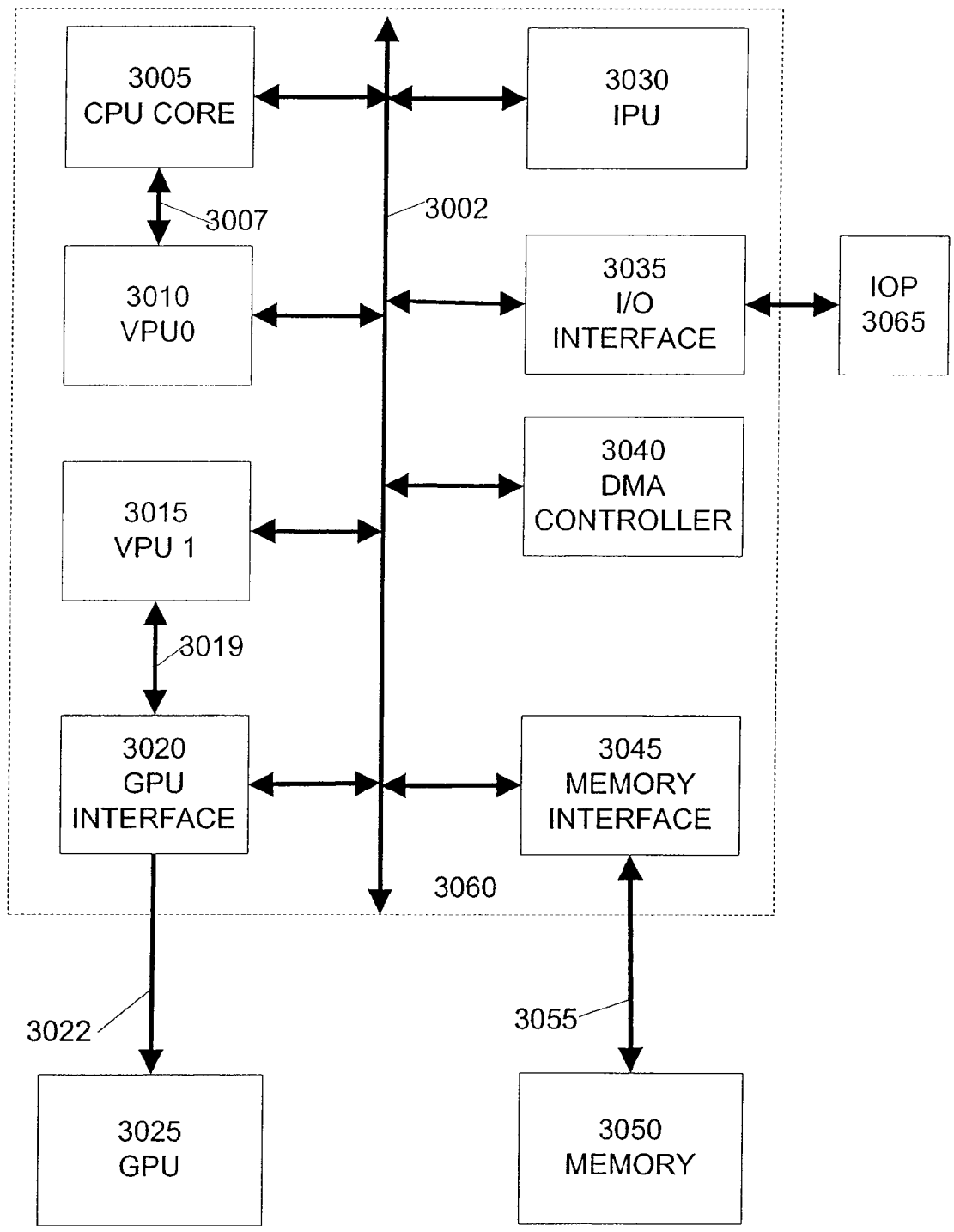
FIG. 8 illustrates an example target computer system capable of being emulated using embodiments of the invention.

Embodiments of the invention can be used to improve emulator performance and compatibility for a variety of different types of target computer systems, including general computer system 1000 shown above. FIG. 8 illustrates another example target computer system 3000 capable of being emulated using embodiments of the invention.

Target computer system 3000 illustrates the hardware architecture of the Sony Playstation 2 video game console. Target computer system 3000 includes a variety of components connected via a central data bus 3002. These components include a CPU core 3005; a pair of vector processing units, VP0 3010 and VP1 3015; a graphics processing unit interface 3020; an image processing unit 3030; an I/O interface 3035; a DMA controller 3040; and a memory interface 3045. In addition to the central data bus 3002, target computer system 3000 includes a private bus 3007 between CPU core 3005 and vector processing unit VP0 3010 and a private bus 3019 between vector processing unit VPU 1 3015 and graphics processing unit interface 3020.

In some applications, components 3005, 3010, 3015, 3020, 3030, 3035, 3040 and 3045 are included within a processor chip 3060. Processor chip 3060 is connected with graphics processing unit 3025 via graphics bus 3022 and with memory 3050 via memory bus 3055. Additional external components, such as sound and audio processing components, network interfaces, and optical storage components 3065, are omitted from FIG. 8 for clarity.

Figure 9:
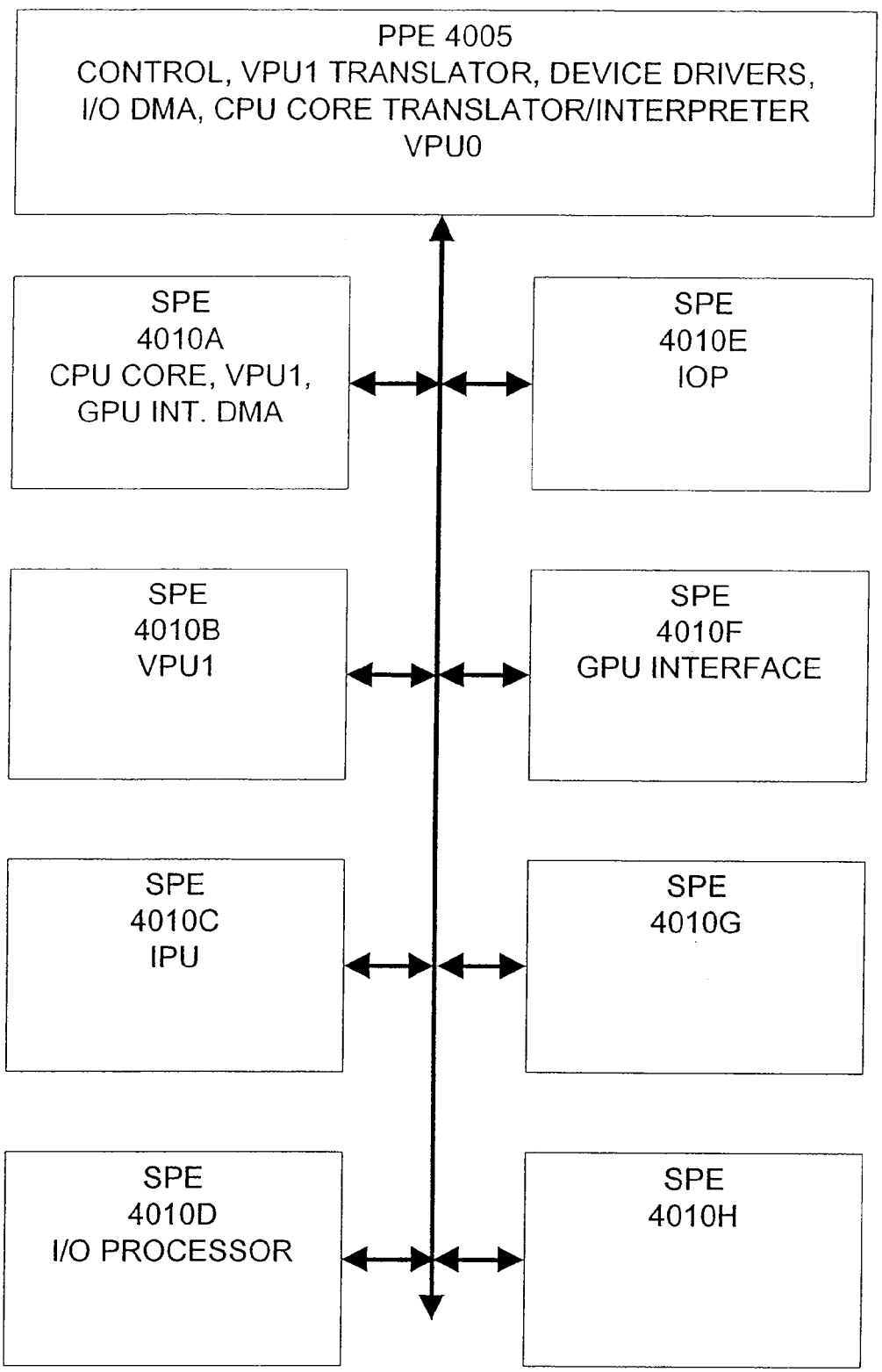
FIG. 9 illustrates an example emulator architecture on a host computer system capable of emulating the target computer system of FIG. 8.

FIG. 9 illustrates an example emulator architecture 4000 on a host computer system capable of emulating the target computer system 3000 of FIG. 8. In this example, emulator architecture 4000 is implemented on a host computer system including a processor similar to processor 2000 of FIG. 7.

In emulator architecture 4000, PPE processor element 4005 executes one or more emulator threads that provide functions including emulator control; device drivers; a vector processing unit VPU1 code translator; CPU core emulation including code interpreters and translators; and vector processing unit VPU0 emulation.

SPE processor element 4010A executes one or more emulation threads that provide functions including DMA controller emulation; vector processing unit VPU1 interface emulation; and graphics processing unit interface arbitration.

SPE processor element 4010B executes one or more emulation threads that execute the translated or recompiled vector processing unit VPU1 code. SPE processor element 4010C executes one or more emulation threads that emulate the image processing unit. SPE processor element 4010D executes one or more emulation threads that emulate the I/O interface functions. SPE processor element 4010E executes one or more emulation threads that emulate the functions of sound and audio processors. SPE processor element 4010F executes one or more emulation threads that emulate the functions of the graphics processing unit interface.

In some implementations, additional emulation threads executed by PPE processor element 4005 and/or SPE processor elements can emulate the functionality of the graphics processing unit of the target computer system or translate graphics processing instructions to a format compatible with the graphics processing unit of the host computer system (omitted for clarity from FIG. 9). In other implementations, the host computer system can include a graphics processing unit similar to or compatible with the graphics processing unit of the target computer system.

Additionally, embodiments of the invention can be utilized to improve the performance of multithreaded emulation and virtual machine applications. For example, embodiments of the invention can be used to emulate video game consoles such as the Playstation, Playstation 2, and PSP systems; x86-based computer and video game systems; PowerPC-based computer and video game systems; and Java, .NET, and other virtual machine and runtime environments.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of executing an application of a target computer using a host computer, the host computer including instructions to utilize valid cached translated code to emulate functionality of the target computer when available, the method comprising:

in response to a first instruction received from an emulation environment to translate target application code into code blocks executable by the host computer, partitioning the target application code into a plurality of target application code blocks of related instructions;

chaining together related target application code blocks to form a plurality of target application code block groups, each target application code block group being identified at least in part by selecting a block group start point in the target application code and tracing a control flow of the target application code from the block group start point to each block end point corresponding to the block group start point, each target application block end point including a control flow instruction of the target application code, each target block group being analyzed to ensure that the target block code does not include a conflict or exceed a determined size limit based at least in part upon a potential destination address for at each branch or control flow instruction of the target block group;

translating each target application code block group into a format capable of being executed by the host computer, and storing each translated block group to a translated code cache along with a first cache tag for the translated code block group, the first cache tag for each translated code block group representing a checksum or memory address derived from an effective memory address or source memory address of the block group boundaries for a respective code block group, wherein the checksum supports identification matching of an untranslated block group and a corresponding and previously-cached block group, and wherein the derived effective or source memory address supports determination of a potential violation upon a branch by an instruction within an untranslated block group outside the predetermined size limit, or upon address relocation of the untranslated code block with respect to the fixed location of a corresponding and previously cached block group;

in response to a second instruction from an emulation environment, identifying at least one target application code block group to be executed by the host computer emulating operation of the target computer, determining a second cache tag for each identified target application code block group to be executed, each second cache tag representing a checksum or memory address derived from an effective memory address or source memory address of block group boundaries for a respective identified target block group;

comparing the determined second cache tag to the first cache tag associated with each translated code block group in the translated code cache to determine whether the translated code cache includes a valid translated block group corresponding to each target application code block group, wherein the host computer is operable to select the valid translated block group from the translated code cache when available for execution in response to the second instruction; and in response to a determination that the translated code cache includes a valid translated block group corresponding to the target application code block group, executing the valid translated block group at the host computer, wherein a target translated code block group does not need to be retranslated if a valid version of the target translated code block group exists in the translated code cache on the host computer.

2. The method of claim 1, wherein the target application code block group includes relocatable target application code adapted to be executed from different memory addresses.

3. The method of claim 1, wherein the control flow instruction includes a function call instruction.

4. The method of claim 1, wherein the control flow instruction includes a branch instruction.

5. The method of claim 1, wherein the control flow instruction includes a function return instruction.

6. The method of claim 1, wherein the control flow instruction includes a jump table call instruction.

7. The method of claim 1, wherein the block group start point includes a function entry point.

8. The method of claim 1, wherein the block group start point includes an instruction intended to be executed following a control flow instruction.

9. The method of claim 1, wherein the block group start point and a plurality of block end points define a block group including at least two target application code blocks partitioned according to the plurality of block end points.

10. The method of claim 9, wherein the block group includes two target application code blocks adapted to be executed in sequence, and wherein a corresponding translated block group includes at least two corresponding translated code blocks arranged in adjacent portions of host computer memory, such that the host computer can execute the at least two corresponding translated code blocks in sequence without branching.

11. The method of claim 9, wherein the block group includes a first target application code block including a function call and a second target application code block adapted to be executed upon returning from the function call, and wherein a corresponding translated block group includes first and second translated code blocks corresponding with the first and second target application code blocks, wherein the first translated code block includes a host computer function call instruction and the first and second translated code blocks are arranged in adjacent portions of host computer memory, such that a pipeline stall in the host computer is prevented upon returning from the host computer function call instruction to execute the second translated code block.

12. The method of claim 9, wherein chaining together related target application code blocks to form a plurality of block groups comprises:

determining a branch size restriction for a first target application code block;

identifying at least one target application code block to be executed after the first target application code block;

determining if a location of the identified target application code block relative to the first target application code block complies with the branch size restriction; and in response to the determination that the location of the identified target application code block relative to the first target application code block does not comply with the branch size restriction:

removing the first target application code block from the block group; and adding the first target application code block to a new block group.

13. The method of claim 9, wherein chaining together related target application code blocks to form a plurality of block groups comprises:

determining a branch size restriction for the target application code blocks of the block group;

determining a block group size restriction based on the branch size restriction;

determining if the block group complies with the block group size restriction; and in response to the determination that the block group does not comply with the block group size restriction:

removing at least one target application code block from the block group; and adding the removed target application code blocks to a new block group.

14. The method of claim 1, wherein translating the target application code block group to a host computer format comprises:

identifying a first instruction of the target application code block group accessing a status flag value;

identifying at least one second instruction of the target application code block group potentially providing the status flag value to the first instruction;

creating at least one status flag host instruction corresponding to each of the second instructions of the target application code block group and adapted to store the status flag value outside of a status flag register of the host computer system;

creating at least one first host instruction corresponding with the first instruction of the target application code group and adapted to access the status flag value provided by the status flag host instruction.

15. The method of claim 14, wherein the status flag host instruction includes an instruction adapted to recreate a status flag value of the target computer system.

16. The method of claim 14, wherein the status flag host instruction includes an instruction adapted to read a status flag value from the status flag register of the host computer.

17. The method of claim 16, wherein the status flag host instruction includes an instruction adapted to modify a status flag value of the status flag register of the host computer to match a behavior of a status flag register of the target computer.

18. A computer program product embedded in a computer readable medium for executing an application of a target computer using a host computer, the host computer including instructions to utilize valid cached translated code to emulate functionality of the target computer when available, comprising:

program code for, in response to a first instruction received from an emulation environment to translate target application code into code blocks executable by the host computer, partitioning the target application code into a plurality of target application code blocks of related instructions;

program code for chaining together related target application code blocks to form a plurality of target application code block groups, each target application code block group being identified at least in part by selecting a block group start point in the target application code and tracing a control flow of the target application code from the block group start point to each block end point corresponding to the block group start point, each target application block end point including a control flow instruction of the target application code, each target block group being analyzed to ensure that the target block code does not include a conflict or exceed a determined size limit based at least in part upon a potential destination address for at each branch or control flow instruction of the target block group;

program code for translating each target application code block group into a format capable of being executed by the host computer, and storing each translated block group to a translated code cache along with a first cache tag for the translated code block group, the first cache tag for each translated code block group representing a checksum or memory address derived from an effective memory address or source memory address of the block group boundaries for a respective code block group, wherein the checksum supports identification matching of an untranslated block group and a corresponding and previously-cached block group, and wherein the derived effective or source memory address supports determination of a potential violation upon a branch by an instruction within an untranslated block group outside the predetermined size limit, or upon address relocation of the untranslated code block with respect to the fixed location of a corresponding and previously cached block group;

program code for, in response to a second instruction from an emulation environment identifying at least one target application code block group to be executed by the host computer emulating operation of the target computer, determining a second cache tag for each identified target application code block group to be executed, each second cache tag representing a checksum or memory address derived from an effective memory address or source memory address of block group boundaries for a respective identified target block group;

program code for comparing the determined second cache tag to the first cache tag associated with each translated code block group in the translated code cache to determine whether the translated code cache includes a valid translated block group corresponding to each target application code block group, wherein the host computer is operable to select the valid translated block group from the translated code cache when available for execution in response to the second instruction; and program code for executing the valid translated block group at the host computer in response to a determination that the translated code cache includes a valid translated block group corresponding to the target application code block group, wherein a target translated code block group does not need to be retranslated if a valid version of the target translated code block group exists in the translated code cache on the host computer.

19. A system for executing an application of a target computer using a host computer, the host computer including instructions to utilize valid cached translated code to emulate functionality of the target computer when available, the method comprising:

a processor; and a memory device including instructions that, when executed by the processor, cause the processor to:

in response to a first instruction received from an emulation environment to translate target application code into code blocks executable by the host computer, partition the target application code into a plurality of target application code blocks of related instructions; chain together related target application code blocks to form a plurality of translated application code block groups, each target application code block group being identified at least in part by selecting a block group start point in the target application code and tracing a control flow of the target application code from the block group start point to each block end point corresponding to the block group start point, each target application block end point including a control flow instruction of the target application code, each target block group being analyzed to ensure that the target block code does not include a conflict or exceed a determined size limit based at least in part upon a potential destination address for at each branch or control flow instruction of the target block group;

translate each target application code block group into a format capable of being executed by the host computer, and storing each translated block group to a translated code cache along with a first cache tag for the translated code block group, the first cache tag for each translated code block group representing a checksum or memory address derived from an effective memory address or source memory address of the block group boundaries for a respective code block group, wherein the checksum supports identification matching of an untranslated block group and a corresponding and previously-cached block group, and wherein the derived effective or source memory address supports determination of a potential violation upon a branch by an instruction within an untranslated block group outside the predetermined size limit, or upon address relocation of the untranslated code block with respect to the fixed location of a corresponding and previously cached block group;

in response to a second instruction from an emulation environment, identifying at least one target application code block group to be executed by the host computer emulating operation of the target computer, determine a second cache tag for each identified target application code block group to be executed, each second cache tag representing a checksum or memory address derived from an effective memory address or source memory address of block group boundaries for a respective identified target block group;

compare the determined second cache tag to the first cache tag associated with each translated code block group in the translated code cache to determine whether the translated code cache includes a valid translated block group corresponding to each target application code block group, wherein the host computer is operable to select the valid translated block group from the translated code cache when available for execution in response to the second instruction; and in response to a determination that the translated code cache includes a valid translated block group corresponding to the target application code block group, execute the valid translated block group at the host computer, wherein a target translated code block group does not need to be retranslated if a valid version of the target translated code block group exists in the translated code cache on the host computer.

20. A system according to claim 19, wherein:
the control flow instruction includes one of a function call instruction, a branch instruction, a function return instruction, and a jump table call instruction.

* * * * *